June 2, 1970  R. N. NIELSEN, JR  3,515,418
LOCKING MECHANISM AND TELESCOPING ASSEMBLY
Filed June 18, 1968  2 Sheets-Sheet 1
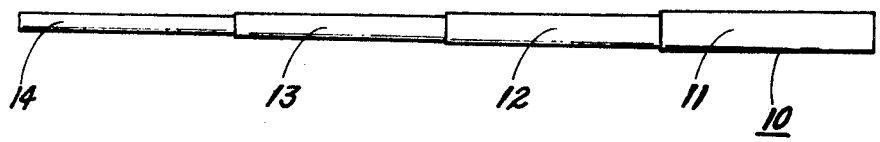
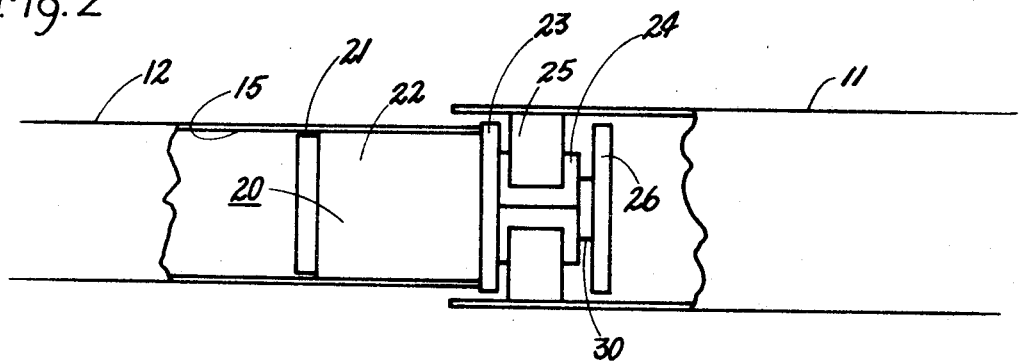
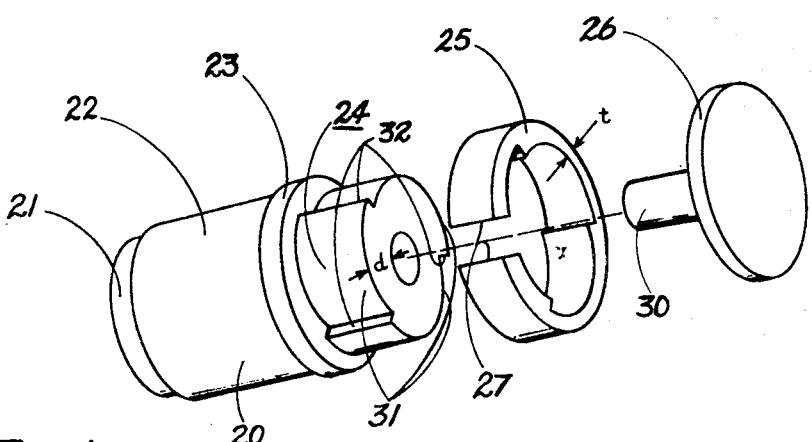
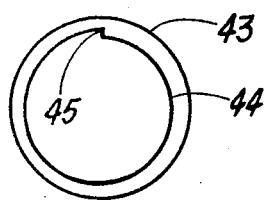 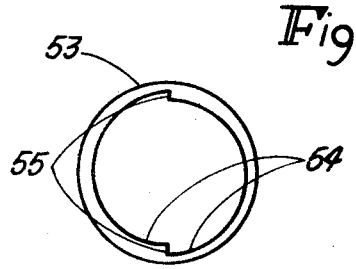
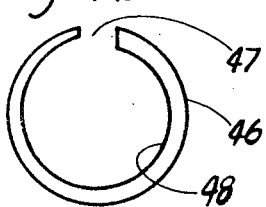 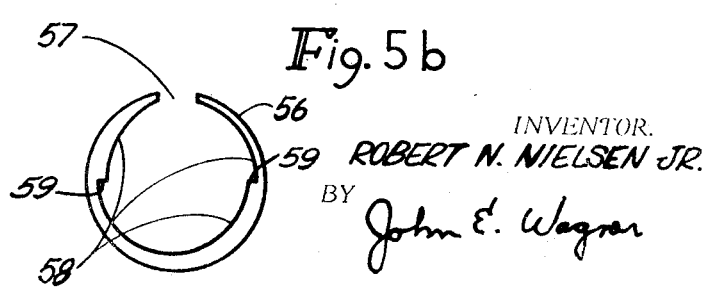
INVENTOR.
ROBERT N. NIELSEN JR.
BY John E. Wagner

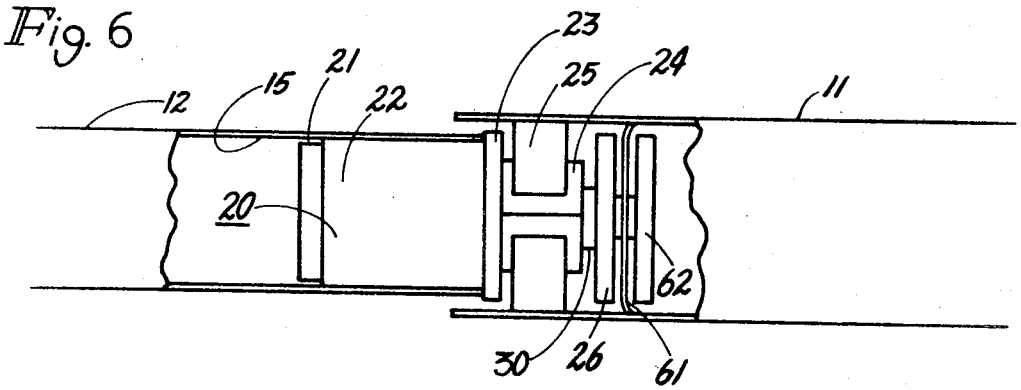
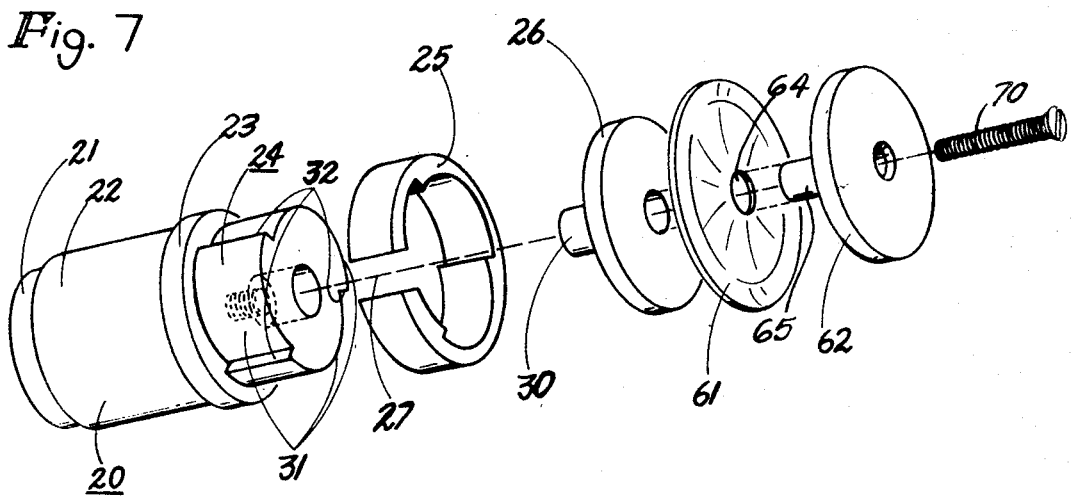
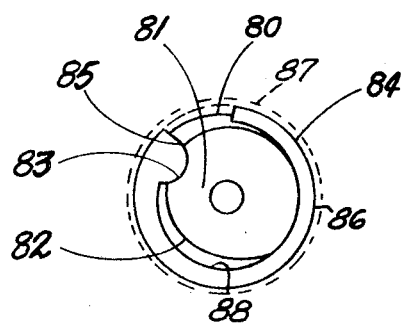
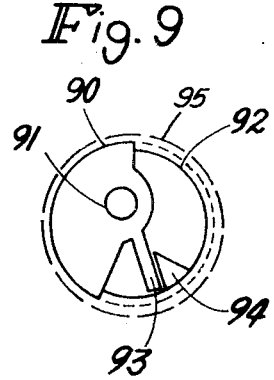

United States Patent Office 3,515,418
Patented June 2, 1970

3,515,418
LOCKING MECHANISM AND TELESCOPING ASSEMBLY
Robert N. Nielsen, Jr., Woodland Hills, Calif., assignor to American Nucleonics Corporation, Glendale, Calif., a corporation of California
Filed June 18, 1968, Ser. No. 737,949
Int. Cl. E04g 25/08
U.S. Cl. 287—58                                4 Claims

ABSTRACT OF THE DISCLOSURE

An improved locking mechanism for telescoping tubular members is disclosed constituting in its completed form two parts, a body and a locking ring, which cooperate with the wall surfaces of the telescoping members to selectively lock and release the members by twisting in clockwise or counterclockwise directions.

---

This invention is an improvement over the basic locking mechanism of U.S. Pat. 3,095,825, which is exclusively licensed to the assignee of this invention. The disclosure also described a simplified assembly technique for such locking mechanism resulting from the improved design.

BACKGROUND OF THE INVENTION

This invention relates to locking mechanism for telescoping tubular members operating on the principle of frictional engagement between an expanding locking mechanism and the walls of the tubular members.

The best example of locking mechanisms of this type is shown in the aforementioned patent. Basically, they include a cylindrical body of outer dimension suitable for permanent press fit within the inner tube. The body includes an extension having a pair of end flanges of diameter slightly less than the interior of the larger of the two telescoping members. The end flanges enclose a central cam surface of reduced diameter. Restrained between the end flanges in the patented mechanism are a plurality of locking rings of sufficient outer diameter to lightly engage the inner wall surface of the outer telescoping member when in the unlocked condition. When twisted in the locking direction, the rings are pressed into firm frictional engagement which rigidly locks the two tubular members.

SUMMARY OF THE INVENTION

I have found that prior art locking mechanisms of this type, although effective, offer some difficulty in assembly and further may be simplified in design without degradation in performance. In fact, in certain respects, locking efficiency can be improved by the simplified structure.

In particular, I have found that a structure in which the end flange is manufactured as a separate element allows the locking ring to be designed to optimum dimensions, including wall thickness and easily assembled without distortion. Moreover, using an optimum design, locking ring eliminates the need for multiple rings thereby reducing overall costs, simplifying assembly, and improving performance.

BRIEF DESCRIPTION OF THE DRAWING

These advantages may be more clearly understood from the following detailed description and by reference to the drawing in which:

FIG. 1 is a side view of a typical telescoping structure of the type suitable to employ this invention;

FIG. 2 is an enlarged view of one joint of the structure of FIG. 1 with portions broken away to show the internal locking device;

FIG. 3 is an exploded view of the locking device of FIG. 2;

FIGS. 4a and 4b are end views of the body and locking ring, respectively, of another embodiment of this invention employing a single cam surface;

FIGS. 5a and 5b are end views of the body and locking ring, respectively, of another embodiment of this invention employing two cam surfaces;

FIG. 6 is a view similar to FIG. 2 of another embodiment employing a flexible seal for use in fluid sealing applications;

FIG. 7 is an exploded view of the seal of FIG. 6 with the seal structure shown in more detail;

FIG. 8 is an end view of another embodiment of this invention with the end flange removed to illustrate the cam and locking ring relationship; and, FIG. 9 is an end view of another embodiment of this invention with the outer flange removed to illustrate the operative details of the locking ring.

DETAILED DESCRIPTION OF THE DRAWING

Now referring to the drawing, FIG. 1 shows a typical application of a locking device of this invention. It is a telescoping boom 10 designed to be light in weight and suitable for extension to any particular length desired and locking at any particular length at the will of the operator merely by twisting two adjacent sections, such as sections 11 and 12, relative to each other in the locking direction which may, for example, be clockwise as viewed from the larger diameter end. The telescoping structure, of course, in addition to being extended to full length as shown in FIG. 1, may be retracted by twisting adjacent sections, for example, sections 13 and 14, in the non-locking, for example, counterclockwise direction, and sliding the smaller diameter tube 14 into the larger diameter tube 13. The same procedure with the sections 12 and 13 and 11 and 12 are repeated to provide a compact stored extensible boom. Structures of this type, in general, are well known for use in camera tripods, collapsible marine devices, such as, paddles and gaff hooks as shown in the patent referenced above and any of a large number of other applications.

The heart of the telescoping structure is the locking mechanism and this may be seen in more detail in its operational arrangement by reference to FIG. 2, which is a greatly enlarged section of the joint between sections 11 and 12 of FIG. 1 with portions of the wall sections cut away for convenience in viewing the locking mechanism. The sections 11 and 12 may be seen to be thin walled tubular material; for example, aluminum, Fiberglas, or any other material capable of being formed into thin tubular sections and having a sufficient wall strength to be self-supporting and support additional sections required. In one preferred embodyment, the material is anodized aluminum of outside diameters ranging downward from 1¼″ with the wall thickness of 0.030 in. In another sample embodiment, the structure is of Fiberglas and includes stepped sections having outside diameters ranging from 1½″ to ⅜″ and wall thickness in the order of ³⁄₃₂″.

Regardless of the tubular material used, it should be of circular or nearly circular cross-section and have inner surfaces capable of significant frictional engagement with the locking device in order to secure adjacent sections by frictional engagement alone.

The locking element of this invention, in its basic manufactured form, comprises a body portion 20, having a stepped or relieved end 21 of smaller diameter than the inside diameter of the smaller tube 12 and having a cylindrical body portion 22 of diameter such that it is in press fit relationship for permanent mounting within the tube 12. The body 20 extends into the tube 12 sufficient distance to obtain firm permanent engagement with inner wall of tube 12 and has at one end a flange 23 which limits the entrance of the body 20 into tube 12 and also forms a retainer for locking ring 25 to be described hereafter. The locking ring 25 shown better in FIGS. 3, 4b and 5b encircles a cam portion 24 which is integral with the body 20 and extends out of the tube 12. Affixed to the end of the cam portion in its final manufactured form is an outer flange 26 which is secured to the cam portion 24 by a central stem 30 extending into a mating hole in the cam portion 24. The flanges 23 and 26 are of diameter slightly less than the inside diameter of the tube 11 whereby they clear the tube 11 at all times and do not interfere with the extension or retraction of the mating tubes 11 and 12. The locking ring 25 however, restrained between the two flanges 23 and 26 and overriding the cam portion 24 is of diameter such that it is maintained in at least light frictional engagement with the inner wall of the larger diameter tube 11 at all times. This frictional engagement is obtained by having it manufactured diameter slightly larger than the inner diameter of the larger tube 11 and the ring 25 has sufficient elastic properties such that it is compressed slightly at all times by the inner wall 11. The frictional engagement in this condition is sufficient to maintain contact at all time but insufficient to prevent a sliding along the inner wall surface in the longitudinal direction in the extension or retraction phase of operation. The ring 25 includes inner cam surfaces which mate with the outer surfaces of cam portion 24 in a manner which is better shown in FIGS. 3, 4, and 5.

It has been found that a material cycolac GSM–1000, acrylonitrile butadiene styrene of the Marbon Chemical Division of Borg Warner Corp. which has a suitable dimensional stability, elasticity, and strength properties for use in the locking device.

Now referring to FIG. 3, the structure of the body 20 may be seen more clearly and, in particular, the form and makeup of the cam portion 24 is apparent. The cam portion 24 is an axial extension of the body 20 extending outward from the flange 23 and includes three cam surfaces, each constituting continuous curve surfaces 31 extending from a minimum diameter adjacent to a step 32 to a maximum diameter adjacent to the next step 32. The locking ring 25 which encircles the cam 24 has mating cam surfaces which in the unlocked position, are in loose slip fit relation with the steps 32 and cam surfaces 31 and rides loosely over the cam portion 24. The outer flange 26, which retains the locking ring 25 over the cam portion 24 may also be more clearly seen in FIG. 3. It has an elongated stem 30 secured either by frictional engagement or by suitable adhesive in a permanent connection with a central hole in the cam portion 24. As finally manufactured and assembled into telescoping structure, the outer flange 26 has become an integral part of the body 20 whereby the entire locking mechanism is made up of only two parts, the body 20 and the locking ring 25.

It should be noted that FIG. 3 not only shows the exploded form of the final structure but also illustrates the manner in which the locking device is assembled. This illustrates two very significant facets of this invention. In particular, it should be noted that there is only a single locking ring 25 where in the past it was considered essential to have two or more such rings to counteract the inefficiencies of the engagement of any one or more of the rings. This limit of efficiency of engagement of the ring 25 with its mating inner wall surface has been eliminated according to this invention by controlling the mean radial thickness of the ring 25. The thickness dimension as illustrated in the drawing by the reference letter $t$ is substantially greater than possible in prior art devices made up of a plurality of rings and a unitary body and retaining flanges. Given the optimum thickness of the ring 25 for efficient frictional engagement in the non-locking condition, the mean diameter D of the body cam portion can be adjusted accordingly. In the past, with integral body and flange structures, the locking rings used were necessarily of thin wall to allow them to be distorted sufficiently to be snapped over either end flange or the central cam portion. When these locking rings are made thin enough to allow ease of assembly and the gap 27 large enough to allow it to be snapped over the body or cam portion, the locking ring does not have optimum strength to maintain the necessary frictional engagement with the inner wall its wall of its mating tube section. Consequently, multiple rings have been required to insure reliable locking.

The single locking ring 25, in accordance with this invention, is locked in the same manner as the prior art by rotation of one telescoping member whereby the locking ring 25 is expanded by engagement of its cam surfaces with those of the body cam portion 24. As shown here in FIG. 3, the body cam portion 24 and the locking ring 25 each have three cam surfaces and three steps. This affords three area application of expansion force to the locking ring.

I have found that the number of cam surfaces is not critical and have produced efficient locking devices, including a few as a single surface as illustrated in FIG. 4a, an end view of the body portion of another embodiment, which shows an integral body flange 43 and the extending cam surface 44 and step 45. The flange 43, cam surface 44 and step 45 correspond to the flange 23, cam surface 24 and one step 32 of FIG. 3. The cam surface 44 is a continuous curve expending in diameter from the minimum diameter at the base of step 45 to a maximum diameter at the top of step 45. FIG. 4b illustrates the mating locking ring 46 which similarily to the locking ring 25 has a circular outer surface of slightly larger diameter than the inner diameter of the tube to which it is to lock and a single continuous inner curved cam surface 48 with the step portion at the slot 47. The single cam surface arrangement of FIGS. 4a and 4b is exceedingly efficient and is particularly desirable for use on small diameter locking devices, such as those ⅜ of a diameter or less.

Now referring to FIG. 5a which constitutes an end view of the body of another embodiment and FIG. 5b its matching locking ring, a two cam surface locking combination is shown, including body flange 53 and two cam surfaces 54, each terminating in steps 55. The matching locking ring 56 of FIG. 5b includes a pair of cam surfaces 58, in this case one interrupted by the slot 57, and a pair of steps 59. It should be noted in viewing both the locking rings of FIGS. 4b and 5b that the step or discontinuities are positioned at points in the ring where they produce minimum or insignificant local stress on distortion through radial spreading or compression of the ring. In particular in the locking ring of FIG. 4b, the step is positioned at the slot 47 whereby the ring throughout its length has a continuous tapering cross section without any stress concentrating or discontinuity. Employing the basic concept of this invention wherein the locking ring need not be distorted in assembly as illustrated in FIG. 3, this factor is of less significance, however, the elimination of stress concentrating steps in the locking ring is always desirable. In the embodiment of FIG. 5b, the two steps 59 are of positions directly opposite each other and at quarter points (displaced 90° about the axis of the locking assembly) from the gap 57. This placement of steps positions the discontinuity at points of reduced stress upon any distortion of the ring.

Another embodiment of this invention producing a fluid tight seal may be seen in FIG. 6. It includes the same elements of the basic locking device of FIG. 2, including a body 20, flange 23, cam portion 24, locking ring 25 and outer flange 26. In this version, however, the outer flange 26 itself has a central hole to accept a stem of a third flange 62 in spaced relationship with the flange 26. Confined between the second and third flanges 26 and 62 is a flexible plastic seal washer for example of Teflon material having an outside diameter greater than the inside diameter of the larger of the telescoping tubes 11 and a central hole best seen in FIG. 7 which accepts the stem portion of outer flange 62. The locking assembly of FIG. 6 provides an effective fluid seal at all positions of extension of the tube members 11 and 12 and the seal does not interfere with extension, retraction, locking or release of the assembly.

The operative relationship of the seal and outer flange 62 may be more visible in FIG. 7 wherein the seal member 61 and its central hole 64 may be seen and the integral stem 65 are readily seen. The flange 26 as indicated above in connection with FIGS. 2 and 3 is normally in the final assembly cemented to the body 20, however, there exists a need for periodic changing of the seal 61 so the outer flange 62 is better secured by removable means such as a central machine screw 70 mating with threads in the hole 66 of flange 26.

In certain applications, it has been found that the low cost of the entire locking mechanism has made it practical to replace the entire device rather than replace the seal 61. In such a case, the outer or third flange 62 need not be removable and the screw 70 may be eliminated. Then the flange 62 is simply secured to the flange 30 by cementing or other permanent attachment means.

In the foregoing description one basic configuration of locking ring has been illustrated. Another variation appears in FIG. 8 in which the body and integral flange 80 shown in end view includes an axially extending cam portion 81 with its cam surface 82 which is eccentric with respect to the central axis hole and includes a socket portion 83 on one side thereof. The locking ring 84 includes a ball portion 85 mating with socket 83 and a tail extending around the circumference to form an outer frictional surface 86 for engagement with the encircling larger diameter tubular member 87 shown in the drawing by dotted line. The ring 84 includes an inner cam surface 88 which cooperates with the cam surface 82 upon rotation. When the outer tubular member 87 is rotated in a clockwise direction with the body portion 80 held fixed the locking assembly will release and allow clockwise rotation, extension or retraction. With the body portion 80 held rigid and the outer tubular portion 87 turned in a counterclockwise direction, the cam surface 82 bears upon the cam surface 88 of locking ring 84 expanding the ring into tight frictional contact with the inner wall of the outer tubular member 87 in similar manner to the locking structures previously described. This figure illustrates that the configuration of the ring 84 may vary significantly from that shown in FIGS. 3, 4b and 4c and still obtain effective locking. In this embodiment of FIG. 8 of the outer flange is removed to illustrate the working relationship of body 80, cam 82, ring 84 and the outer tubular member 87. In its finished form, the outer flange which is not shown in the drawing, of course, would be in place and restrain the ring 84.

The embodiment of FIG. 9 illustrates that the entire body of the locking member or ring need not be used as a spring but can be a solid disc 90 which is eccentrically pivoted about a pin or pivot 91 secured to or an integral part of body 92.

The disc 90 includes an integral spring member 93 which rides against a stop 94 constituting a part of the body 92. An outer flange, not shown in the drawing, completes the locking device. As in previous embodiments, the body 92 is secured to the inner of two telescoping tubes while the locking device is enclosed in the larger tube 95 which is shown by dotted lines in the drawing.

As in the previous embodiments, the mechanism is actuated by rotation of the tubes with respect to each other. With the inner tube and body 92 held stationary, rotation of the outer tube in a counterclockwise direction the disc 90 is forced into locking engageemnt with the outer tube its eccentric movement about pivot 91. When rotated in the opposite direction, the disc 90 remains in sliding contact with the outer tube under the urging by the integral spring 93 against the body stop 94. Similar to the previous embodiments, the completed assembly comprises only two pieces, the body and locking member thereby producing a low cost, effective locking device.

The foregoing embodiments are shown as illustrative of the principle of this invention and are not to be construed as limiting the scope of the invention. In particular, it is apparent that the most common application for this locking mechanism is in conjunction with telescoping circular tubular member as illustrated in the drawing. It must be recognized that the mechanism is not limited in applications to locked members of that configuration. For example, square, octagonal, hexagonal, or even a pair of planar spaced surfaces may be locked to the mechanism provided there are at least two opposed or nearly opposed surfaces in frictional engagement with the outer surface of the locking ring. Consequently, this invention should not be considered to be defined by the illustrative embodiments. Rather the scope shall be determined by the following claims and the scope of equivalency as afforded under the U.S. patent laws.

I claim:
1. A locking mechanism for telescoping members comprising:
   a lock body having a portion suitable for permanent securement to one end of the smaller of two telescoping members;
   said body including a cam portion having at least one cam surface extending at increasing radial distance from the axis of the body;
   means defining an annular space with the cam portion; and,
   a single expandable ring confined in the annular space and including an outer cylindrical surface of sufficient diameter to maintain contact with at least two points on the larger telescoping member and an inner cam surface mating with the cam surface of the body cam portion whereby relative movement of the body and ring in one direction of rotation causes slipping contact between the ring and the inner wall of the larger telescoping member and relative movement of the body and ring in the opposite direction of rotation produces expansion of the ring into locking frictional engagement between the outer cylindrical surface of the ring and the inner wall surfaces of the larger telescoping member;
   wherein there is an additional flange separably secured to the said flange means and a flexible seal member of diameter greater than the inside diameter of the outer telescoping member, said flexible seal restrained between said flanges.

2. A locking mechanism for telescoping members comprising:
   a lock body having a portion suitable for permanent securement to one end of the smaller of two telescoping members;
   said body including a cam portion having at least one cam surface extending at increasing radial distance from the axis of the body;
   a pair of annular flanges defining an annular space with the cam portions; and,
   a single slotted expandable ring confined in the annular space and including an outer cylindrical surface of sufficient diameter to maintain contact with at least two points on the larger telescoping member and an inner cam surface mating with the cam surface of the body cam portion whereby relative movement of the body and ring in one direction of rotation causes slipping contact between the ring and the inner wall of the larger telescoping member and relative movement of the body and ring in the opposite direction of rotation produces radial expansion of the ring into locking frictional engagement between the outer cylindrical surface of the ring and the inner wall surfaces of the larger telescoping member;

said single ring having a median thickness such that the ring has insufficient deformability to expand over said annular flanges and one of the annular flanges is produced separate from the body;

wherein said cam portion of the body includes a single cam surface and a single step joining the ends of the cam surface and the locking ring contains a matching single cam surface and single step; and, wherein the single step on the locking ring is positioned at the slot of said ring whereby the body of the ring contains no stress concentrating portions therein.

3. A locking mechanism for telescoping members comprising:

a lock body having a portion suitable for permanent securement to one end of the smaller of two telescoping members;

said body including a cam portion having at least one cam surface extending at increasing radial distance from the axis of the body;

a pair of annular flanges defining an annular space with the cam portions; and, a single slotted expandable ring confined in the annular space and including an outer cylindrical surface of sufficient diameter to maintain contact with at least two points on the larger telescoping member and an inner cam surface mating with the cam surface of the body cam portion whereby relative movement of the body and ring in one direction of rotation causes slipping contact between the ring and the inner wall of the larger telescoping member and relative movement of the body and ring in the opposite direction of rotation produces radial expansion of the ring into locking frictional engagement between the outer cylindrical surface of the ring and the inner wall surfaces of the larger telescoping member;

said single ring having a median thickness such that the ring has insufficient deformability to expand over said annular flanges and one of the annular flanges is produced separate from the body;

wherein said cam portion includes two cam surfaces and two steps terminating the cam surfaces and the locking ring includes two mating cam surfaces and steps; and, said steps positioned substantially at the quarter points (90°) around the periphery from the slot therein.

4. A telescoping assembly comprising:

a first tube;

a second tube of slightly larger diameter than the first tube and capable of telescoping over the first tube;

a locking mechanism in said assembly comprising a body portion secured to one end of the first tube and extending beyond the end thereof;

the portion of the body extending beyond the end of the first tube including a cam portion of smaller diameter than the inside diameter of the second tube and presenting a radially expanding cam surface;

said body portion also including a pair of wall surfaces longitudinally enclosing the cam surface;

a single expandable ring member encircling the cam surface between the wall surfaces;

said ring member including an outer surface mating with the inner wall of the second tube and including an inner surface mating with the cam surface of said body; wherein one of the walls of said body enclosing the cam surface is a flange member separable from the body to allow the assembly of the ring member over the cam portion without distortion thereof;

and wherein the assembly includes an additional flange member separably secured to the first flange member and defining an annular space therebetween and a flexible seal member therebetween, said seal member being circular in shape and of larger diameter than the inside diameter of the second tube thereby sealing the first and second tubes.

References Cited
UNITED STATES PATENTS

| | | | |
|---|---|---|---|
| 576,665 | 2/1897 | Farrar | 287—52.09 |
| 696,403 | 4/1902 | Blanton | 287—52.09 |
| 1,982,719 | 12/1934 | Woerner. | |
| 3,391,954 | 7/1968 | Callahan | 287—52.09 XR |
| 2,432,059 | 12/1947 | Zipser. | |
| 2,473,351 | 6/1949 | Thompson et al. | 248—188.5 |
| 2,526,415 | 10/1950 | Refsdal. | |
| 2,991,096 | 7/1961 | Davidson. | |
| 2,992,026 | 7/1961 | Farber | 248—188.5 XR |
| 3,095,825 | 7/1963 | Sandberg et al. | 103—153 |

FOREIGN PATENTS

| | | |
|---|---|---|
| 267,177 | 6/1950 | Switzerland. |
| 1,398,845 | 4/1965 | France. |

REINALDO P. MACHADO, Primary Examiner

A. V. KUNDRAT, Assistant Examiner

U.S. Cl. X.R.

248—188.5, 412